United States Patent
Mondragon-Parra et al.

(10) Patent No.: US 11,698,109 B2
(45) Date of Patent: Jul. 11, 2023

(54) HIGH ANGLE CONSTANT VELOCITY JOINT

(71) Applicant: Steering Solutions IP Holding Corporation, Saginaw, MI (US)

(72) Inventors: Eduardo R. Mondragon-Parra, Freeland, MI (US); James M. Petrowski, Saginaw, MI (US); Jun J. Lu, Saginaw, MI (US); Jenny C. Ho, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 211 days.

(21) Appl. No.: 17/113,569

(22) Filed: Dec. 7, 2020

(65) Prior Publication Data
US 2022/0065306 A1 Mar. 3, 2022

Related U.S. Application Data (60) Provisional application No. 63/071,254, filed on Aug. 27, 2020.

(51) Int. Cl.
*F16D 3/223* (2011.01)
*B62D 7/16* (2006.01)
*F16D 3/2233* (2011.01)

(52) U.S. Cl.
CPC ............. *F16D 3/223* (2013.01); *B62D 7/16* (2013.01); *F16D 3/2233* (2013.01); *F16D 2003/22303* (2013.01); *F16D 2003/22309* (2013.01); *Y10S 464/906* (2013.01)

(58) Field of Classification Search
CPC .......... F16D 3/223; F16D 2003/22303; F16D 2003/22309; F16D 3/2233; B62D 7/16; Y10S 464/906
USPC ......................................................... 464/145
See application file for complete search history.

(56) References Cited

U.S. PATENT DOCUMENTS

| | | | |
|---|---|---|---|
| 1,916,442 A | 7/1933 | Rzeppa | |
| 4,371,049 A | 2/1983 | Goeft et al. | |
| 6,497,622 B1 | 12/2002 | Bilz et al. | |
| 7,112,140 B2 | 9/2006 | Weckerling | |
| 8,523,687 B2* | 9/2013 | Lutz ....................... | F16D 3/223 464/145 |
| 8,545,337 B2 | 10/2013 | Sone et al. | |
| 8,696,472 B2* | 4/2014 | Ebert ....................... | F16D 3/24 464/906 |

(Continued)

FOREIGN PATENT DOCUMENTS

DE 29 22 660 A1 4/1980

OTHER PUBLICATIONS

Rebull, L. M., "How to Make a Graph" University of Chicago Winter Quarterly 1994 [online] [retrieved on Feb. 8, 2019], Retrieved from the Internet: http://astro.uchicago.edu/cara/outreach/resources/other/howtograph.html (Year: 1994).*

(Continued)

*Primary Examiner* — Greg Binda
(74) *Attorney, Agent, or Firm* — Dickinson Wright PLLC (57) ABSTRACT

A constant velocity joint is provided with at least a pair of tracks whose geometry is defined based on ball path that follows a parametric equation and the parametric function is in the form of a polynomial displacement function of a fourth order or larger.

2 Claims, 6 Drawing Sheets

(56) References Cited

U.S. PATENT DOCUMENTS

| | | |
|---|---|---|
| 8,998,729 B2 | 4/2015 | Ooba |
| 9,551,382 B2 * | 1/2017 | Hirukawa ............. F16D 3/2233 |
| 2003/0114230 A1 | 6/2003 | Mondragon-Parra |

OTHER PUBLICATIONS

English translation of Office Action regarding corresponding DE App. No. 10 2020 133 332.3; dated May 5, 2021.

* cited by examiner

HIGH ANGLE CONSTANT VELOCITY JOINT

CROSS-REFERENCE TO RELATED APPLICATION

This application claims the benefit of priority to U.S. Provisional Patent Application No. 63/071,254, filed Aug. 27, 2020, the disclosure of which is incorporated by reference herein in its entirety.

TECHNICAL FIELD

This disclosure relates to a constant velocity joint and in particular to a high angle constant velocity joint with a ball track having a constantly changing curvature.

BACKGROUND

A vehicle, such as a car, truck, sport utility vehicle, crossover, mini-van, marine craft, aircraft, all-terrain vehicle, recreational vehicle, or other suitable vehicles, include driveline systems, as well as various steering system schemes, for example, steer-by-wire and driver interface steering. In steer-by-wire systems, input-response between the driver and the vehicle are largely electronic in nature and are guided by a series of operational algorithms, electronics, and actuators. Because steer-by-wire is largely electronic, a ratio between a mechanical driver input (e.g., the degree that a steering wheel is rotated) and a magnitude of responsive output (e.g., the degree that vehicle wheels turn) may be changed via the operational algorithms. Conversely, the input-response of driver interface steering is largely mechanical in nature and thus cannot be changed via operational algorithms. While steer-by-wire systems are a popular production choice, driver interface steering systems are also popular and oftentimes preferred for various scenarios.

Steering system schemes oftentimes include a constant velocity joint that transmits power through the drive shaft at various angles. Additionally, constant velocity joints may be used in a driveline for a vehicle that transfers a rotational torque from one driveline component to another driveline component. The constant velocity joint facilitates angular displacement or angular movement of components that are interconnected by the constant velocity joint while still facilitating the transmission of torque.

Traditional constant velocity joints include a fixed-center, such as those based on the concept by Alfred Rzeppa (U.S. Pat. No. 1,916,442), which relies on a cam action to control the motion of a plurality of balls located within ball tracks. The location of the balls defines a bisecting plane, which is a fundamental principle of constant velocity joint that provides the transmittal of torque and motion functionality.

The ball tracks define the path traveled by the ball during joint operation and have traditionally been defined by geometries such as combinations of straight segments and arc segments spaced by transition segments. While these geometries have resulted in certain operational benefits over some preceding joints, they continue to result in various operational challenges and shortcomings. For example, when the balls have to travel through the transition segment during operation, the riding experience can be negatively impacted by a driver or passenger. The transition segment can may further include the tangency point between any two dissimilar segments, such as the transition between two different arched segments, an arched segment and a straight segment, or two straight segments disposed at different angles.

When one of the balls travels along an associated ball track it behaves like a follower on a cam, wherein the cam is the functional equivalent of the ball track (basic principle of operation of the Rzeppa joint). An arc segment with a constant radius can be defined as a second order curve (i.e., a conical curve) while a straight segment can be defined as a first order curve. A ball track with an arch segment and a straight segment, such as in U.S. Pat. No. 8,545,337 could be defined by a piecewise function, such as the function provided below:

$$f(x)=Ax^2+Bx+C; \text{ for } xa<=x<=xb$$

$$f(x)=Dx+E; \text{ for } xb<xb<=xc$$

In accordance with the above, xa is the point where the function definition begins, xb is the tangency point and xc is the point where the function definition ends.

Radial ball displacement (visualized as a cam follower) may then be defined with respect to a reference dimension, the Ball Circle Radius (BCR) for example. The radial displacement can be written as below, wherein BCR is a constant reference.

$$s(x)=BCR-f(x)$$

The first derivative of s(x) with respect to time would yield the velocity function of radial motion of the ball, and the second derivative of s(x) would yield the acceleration function. Thus, the derivatives may be defined as:

$$s'(x)=-(2Ax+B); \text{ for } xa<=x<=xb$$

$$s'(x)=-D; \text{ for } xb<x<=xc$$

and;

$$s''(x)=-(2A); \text{ for } xa<=x<=xb$$

$$s''(x)=0; \text{ for } xb<x<=xc$$

The third derivative of s(x) with respect to time, which determines the jerk function would result in the following function:

$$s'''(x)=\text{infinite at } xb$$

In other words, the second derivative s''(x) is not continuous. A discontinuous second derivative or non-finite jerk violate the fundamental law of cam design. "The cam-follower function must be continuous through the first and second derivatives of displacement (i.e. velocity and acceleration) across the entire interval". Corollary: "The jerk function must be finite across the entire interval". See, Norton, Robert L., "Cam Design and Manufacturing Handbook", 2nd ed, Industrial Press, 2009, pp 22-27, ISBN: 978-0-8311-3367-2.

Historically, infinite jerk inside a constant velocity joint is primarily experienced at low speed maneuvers, such as parking, and the ball will operate in a continuous region during normal operation, such as cruising in a highway. Nevertheless, having infinite jerk by design allows the possibility of potential noise, vibration, and harshness ("NVH") issues, especially when the joint is operated at high rotational speeds or when the joint has to move through a transition area due to sudden angulation, such as the joint articulating due to suspension motion caused by a bump or a pothole.

SUMMARY

According to one aspect of the disclosure, a constant velocity joint for a driveline system includes an inner joint part defining a plurality of inner ball races and an outer joint part defining a plurality of outer ball races. The constant velocity joint also includes the inner ball races and the outer ball races cooperate to form a plurality of tracks which each define a respective travel path, wherein at least one of the respective travel paths or tracks is defined as a constantly changing curve with a non-continuous radius. The constant velocity joint further includes a ball located in each of the plurality of tracks.

According to another aspect of the disclosure, a constant velocity joint is provided with at least a pair of tracks whose geometry is defined based on ball path that follows a parametric equation and the parametric function is in the form of a polynomial displacement function of a fourth order or larger.

According to yet another aspect of the disclosure, a constant velocity joint for a steering system includes an inner joint part defining a plurality of inner ball races and an outer joint part defining a plurality of outer ball races. The inner ball races and the outer ball races cooperate to form a plurality of tracks which each define a respective travel path, wherein at least one of the respective travel paths or tracks is defined as a constantly changing curve with a non-continuous radius; and a ball located in each of the plurality of tracks.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, commonly include a steering system including a constant velocity joint. The constant velocity joint is configured such that it may be used in a driveline for transferring a rotational torque from one driveline component to another driveline component. The constant velocity joint facilitates angular displacement or angular movement of components that are interconnected by the constant velocity joint while still facilitating the transmission of torque.

According to one aspect, a high angle constant velocity joint for a steering or driveline system is provided. The high angle constant velocity joint comprises an inner joint part defining a plurality of inner ball races and an outer joint part defining a plurality of outer ball races. Each of the inner ball races and the outer ball races cooperate to form ball tracks which define a travel path of an associated ball. At least one of the travel paths and/or tracks is defined as a constantly changing curve with a non-continuous radius.

In accordance with another aspect, at least one of the travel paths and/or tracks is defined as a parametric curvature.

In accordance with another aspect, a constant velocity joint is provided with at least a pair of tracks whose geometry is defined based on ball path that follows a parametric equation and the parametric function is in the form of a polynomial displacement function of a fourth order or larger. The displacement function defined as:

$$s(x) = BCR - f(x)$$

Where, the parametric form of f(x) for the ball path in the outer race is:

$$x(t) = t$$

$$yo(t) = a1t^n + a2t^(n-1) + a3t^(n-3) + \ldots + a(n+1)t^(n-n), \text{ for } ta \leq t \leq tb \text{ for } n > 3$$

and the parametric equation for the ball path in the inner race is:

$$yi(t) = yo(-t) + \delta(t)$$

Wherein, yi(t) is the mirror image of yo(t), which is an odd function and δ(t) is an adjustment term used to allow for manufacturing variation and clearances necessary for joint operation.

In yet another aspect, the disclosed embodiments include a vehicle comprising a steering or driveline system including a high angle constant velocity joint with travel paths defined by a constantly changing curvature with a non-continuous radius.

Figure 1:
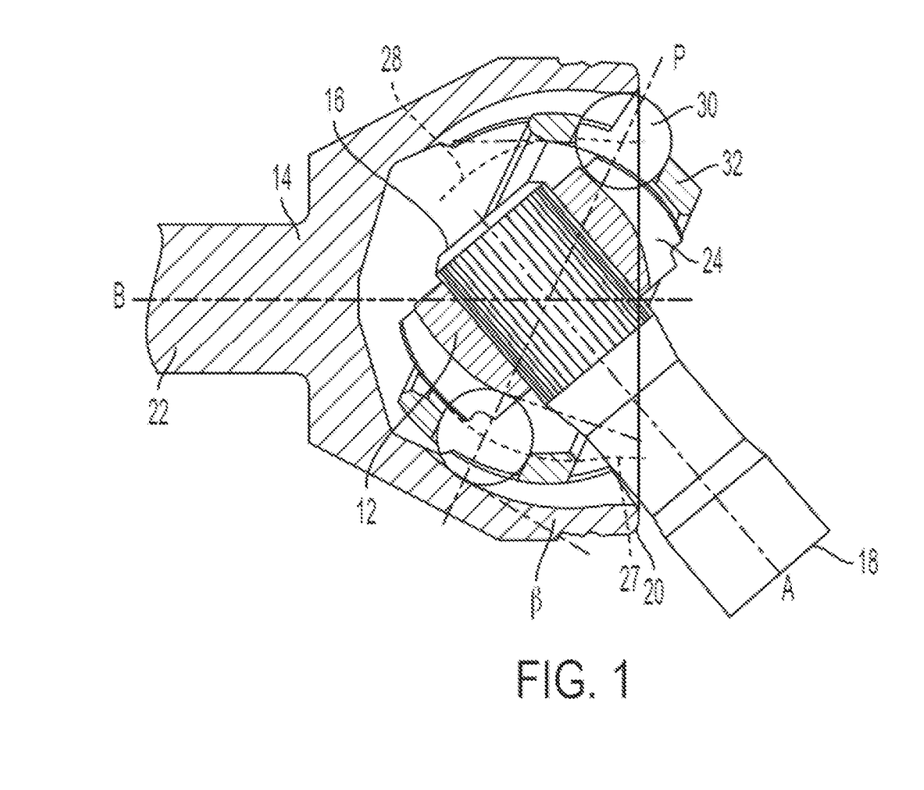
FIG. 1 generally illustrates a constant velocity joint according to the principles of the present disclosure.

FIG. 1 generally illustrates a constant velocity joint 10 according to the principles of the present disclosure. The constant velocity joint 10 may be adapted for use in a steering or driveline system of any suitable vehicle, such as a car, a truck, a sport utility vehicle, a mini-van, a crossover, any other passenger vehicle, any suitable commercial vehicle, or any other suitable vehicle. Moreover, the principles of the present disclosure may apply to other vehicles, such as planes, boats, trains, drones, or other suitable vehicles.

The constant velocity joint 10 includes an inner joint part 12 connected to a first driveline component and an outer joint part connected to a second driveline component. The inner joint part 12 extends between an inner joint end 16 and an inner shaft end 18 along a first axis A. The outer joint part 14 extends between an outer joint end 20 and an outer shaft end 22 along a second axis B. The outer joint end 20 defines an opening for locating the inner joint end 16. The angle between the first axis A and the second axis B defines an articulation angle, wherein when the first axis A and the second axis B are parallel the articulation angle is equal to zero.

An outer surface of the inner joint end 16 defines a plurality of inner ball races 24 circumferentially disposed about the first axis A and an inner surface of the outer joint end 20 defines a plurality of outer balls races 26 circumferentially disposed about the second axis B. Each one of the inner ball races 24 is paired in circumferential alignment with one of the outer ball races 26 to form a track 27 which defines a travel path 28. Each track 27 include a funnel angle β opening towards the first joint part 14 or the second joint part 16 when the joint is not articulated and/or when the joint is articulated.

A plurality of balls 30 are located between the inner joint end 16 and the outer joint end 20, wherein one ball is located in one of the tracks 27. As the first axis A is articulated relative to the second axis B, the ball 30 travel along its respective travel path 28. The number of inner ball races 24 and outer ball races 26 may vary depending on various output preferences. In some embodiments, there are six tracks 27 defined by six paired inner and outer races (24, 26), eight tracks 27 defined by eight paired inner and outer races (24, 26), ten tacks 27 defined by ten paired inner and outer races (24, 26), twelve tracks 27 defined by twelve paired inner and outer races (24, 26), or other numbers of tacks 27 defined by an equal number of paired inner and outer races (24, 26). The travel paths 28 defined by the tracks 27 may define funnel angles β that are different in orientation and/or degree when the joint is articulated and/or when the joint is not articulated and one of the tracks may have a shape different from that of another track.

A cage 32 is located between the inner joint end 16 and the outer joint end 20 and includes a plurality of cage windows 34 for placement of the balls 30. The cage windows 34 circumferentially and axial retain the balls 30. The number of tracks 27 and paired inner and outer races (24, 26) equal to the number of cage windows 34. The cage 32 further locates the balls 30 in a bisection plane P that runs through a center of each ball 30 during zero and non-zero articulation.

Figure 1A:
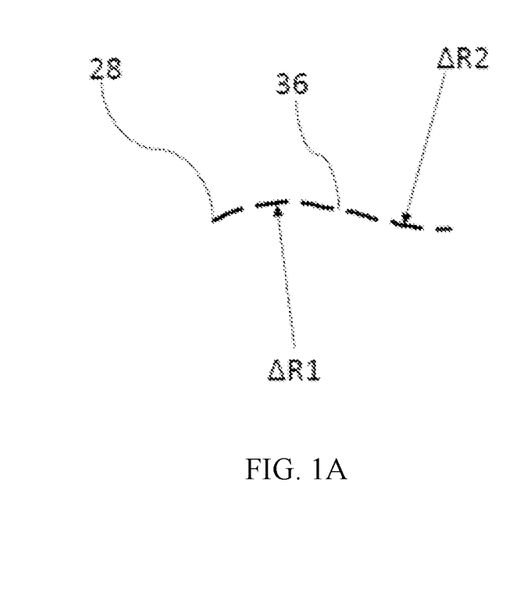
FIG. 1A illustrates an outer race path of the constant velocity joint.

The inner races 24 and the outer races 26 result in at least one travel path 28 and/or track 27 defining any number of geometries. For example, as shown in FIG. 1A, the travel path 28 and/or track 27 may define a continuously changing curvature. The continuously changing curvature may include a transition segment 36 wherein a first continuously changing radius ΔR1 is inverted to a second continuously changing radius ΔR2. The first continuously changing radius ΔR1 and the second continuously changing radius ΔR2 may be inverted opposites or may be asymmetrical with respect to transition segment 36.

Figure 2:
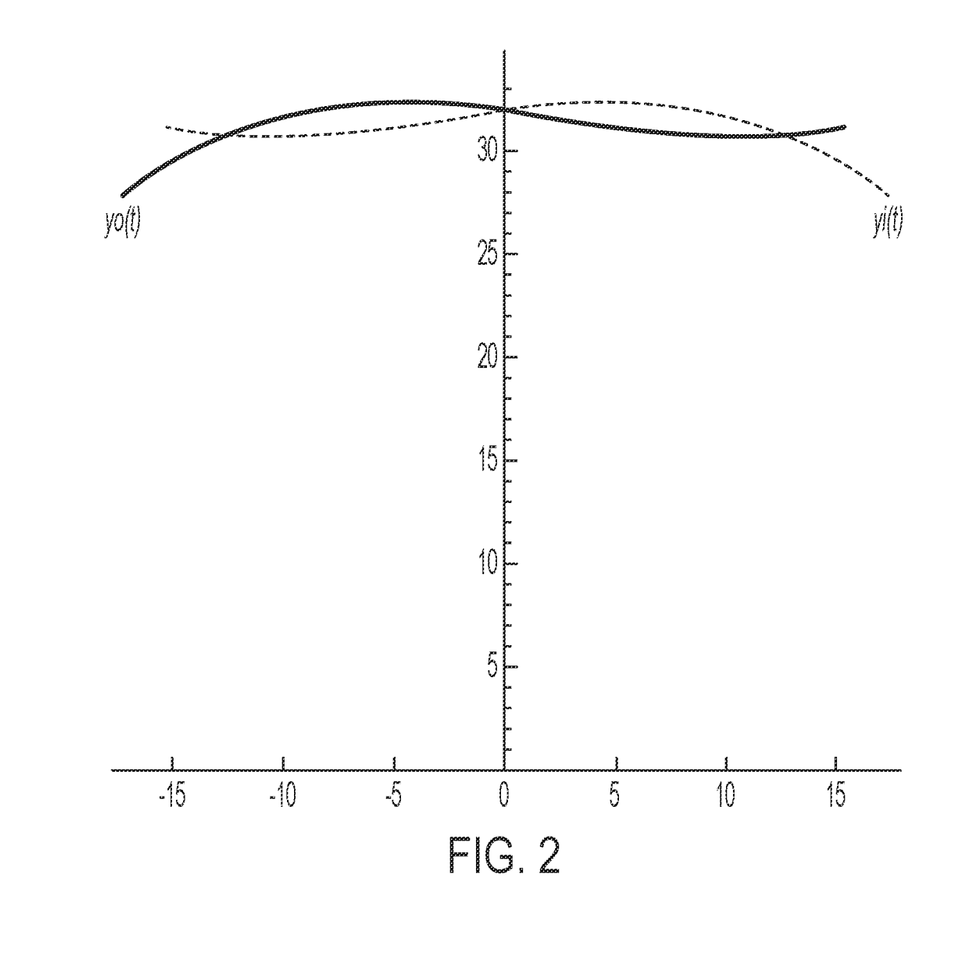
FIG. 2 generally illustrates an example of yo(t) (outer race) and yi(t) (inner race) at zero joint angle according to the principles of the present disclosure.

FIG. 2 generally illustrates an example of yo(t) (outer race 26) and yi(t) (inner race 24) at a zero degree joint angle (i.e., non-articulation angle). The outer race 26 is defined by a parametric continuous function and is a mirror image of the inner race 24.

Figure 3:
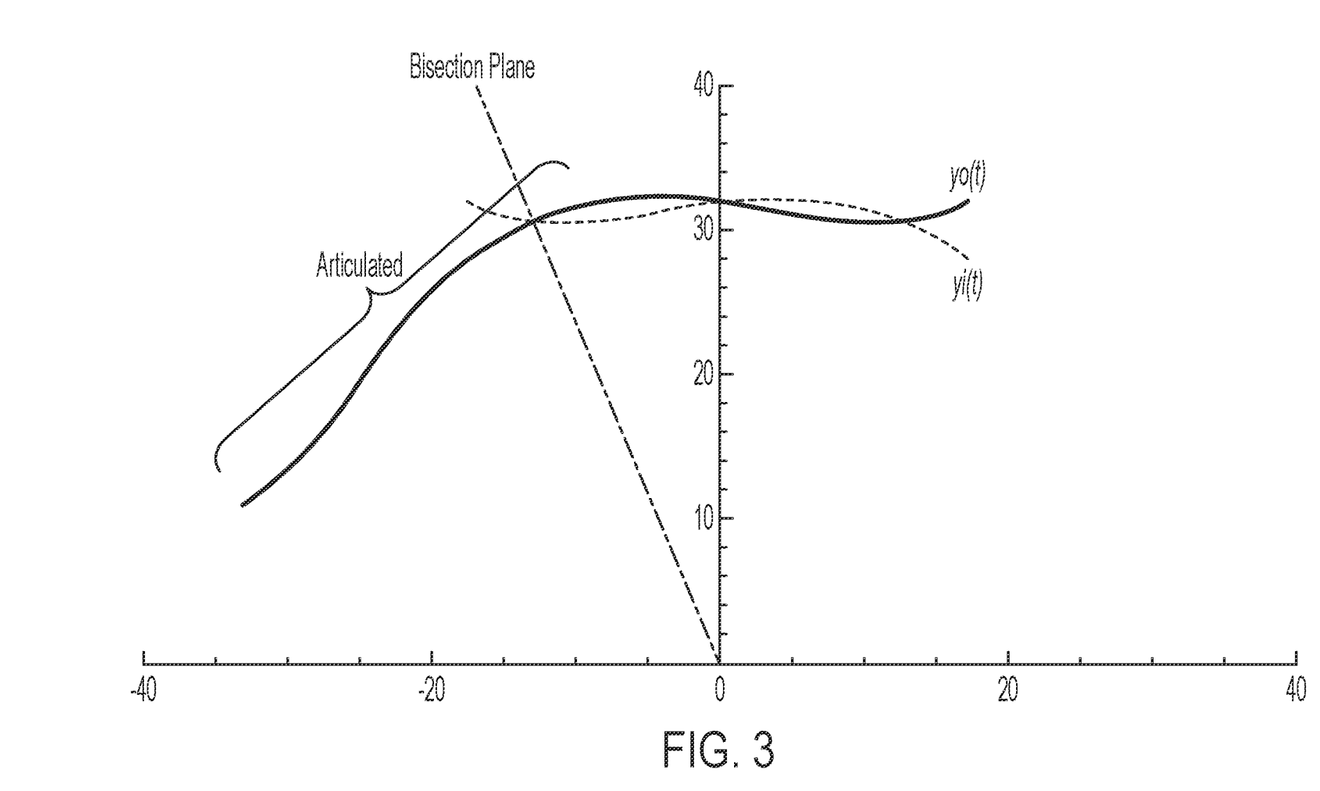
FIG. 3 generally illustrates an example of yo(t) and yi(t) at zero joint angle and articulated inner race, where the bisecting plane is represented by a dashed line according to one aspect of the present disclosure.

FIG. 3 generally illustrates another example of yo(t) and yi(t) at the zero joint angle and an articulated inner race 24 and further illustrating the bisecting plane P. The outer race 26 is defined by a parametric continuous function and is a mirror image of the inner race 24.

Figure 4:
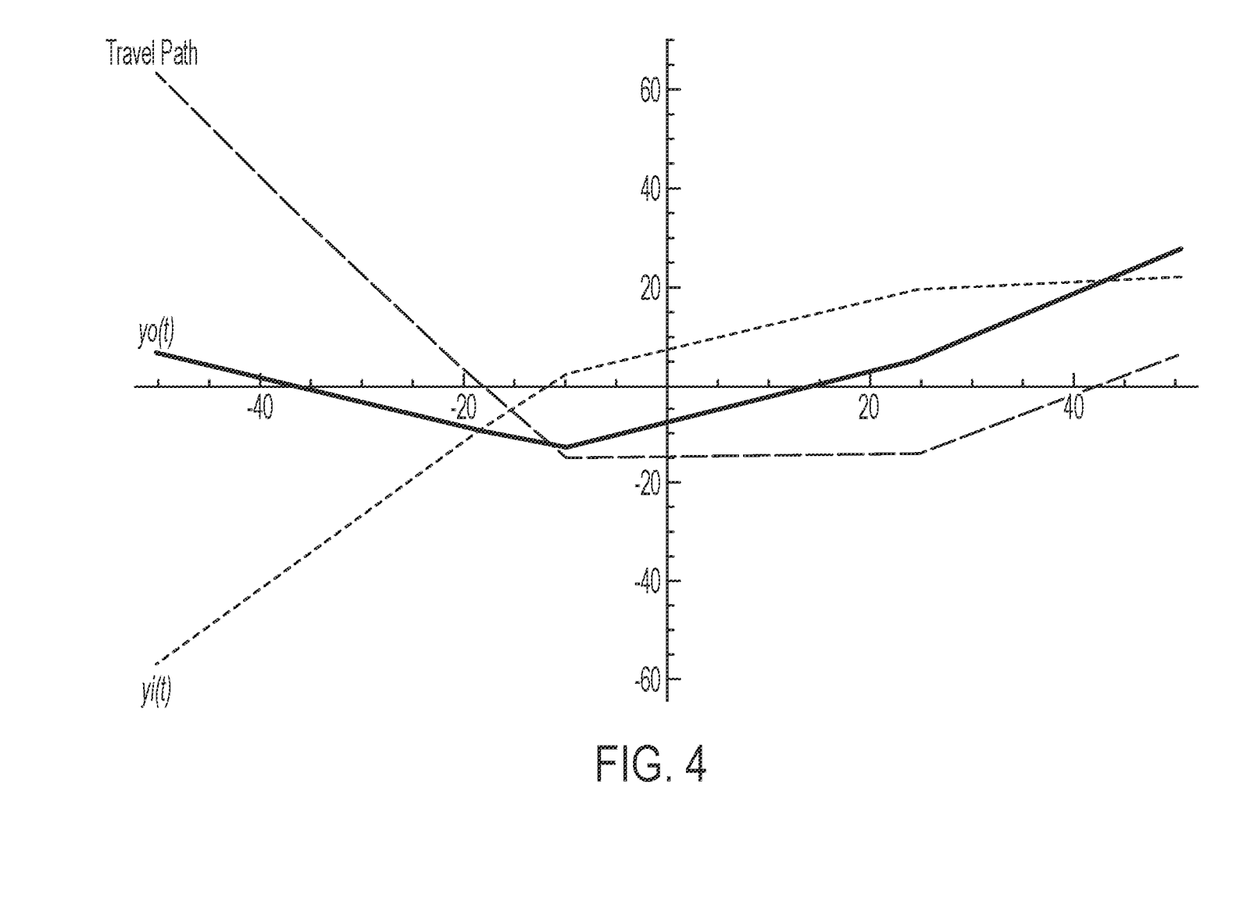
FIG. 4 generally illustrates the first derivatives of the functions when the geometry defined with a set of arcs according to another aspect of the present disclosure.

FIG. 4 generally illustrates the first derivatives in the travel path 28 that is defined by a first arc segment and a second arc segment or as a piecewise function. It should be appreciated that the function is angular or "choppy" and will result in a discontinuous second derivative and infinite jerk.

Figure 5:
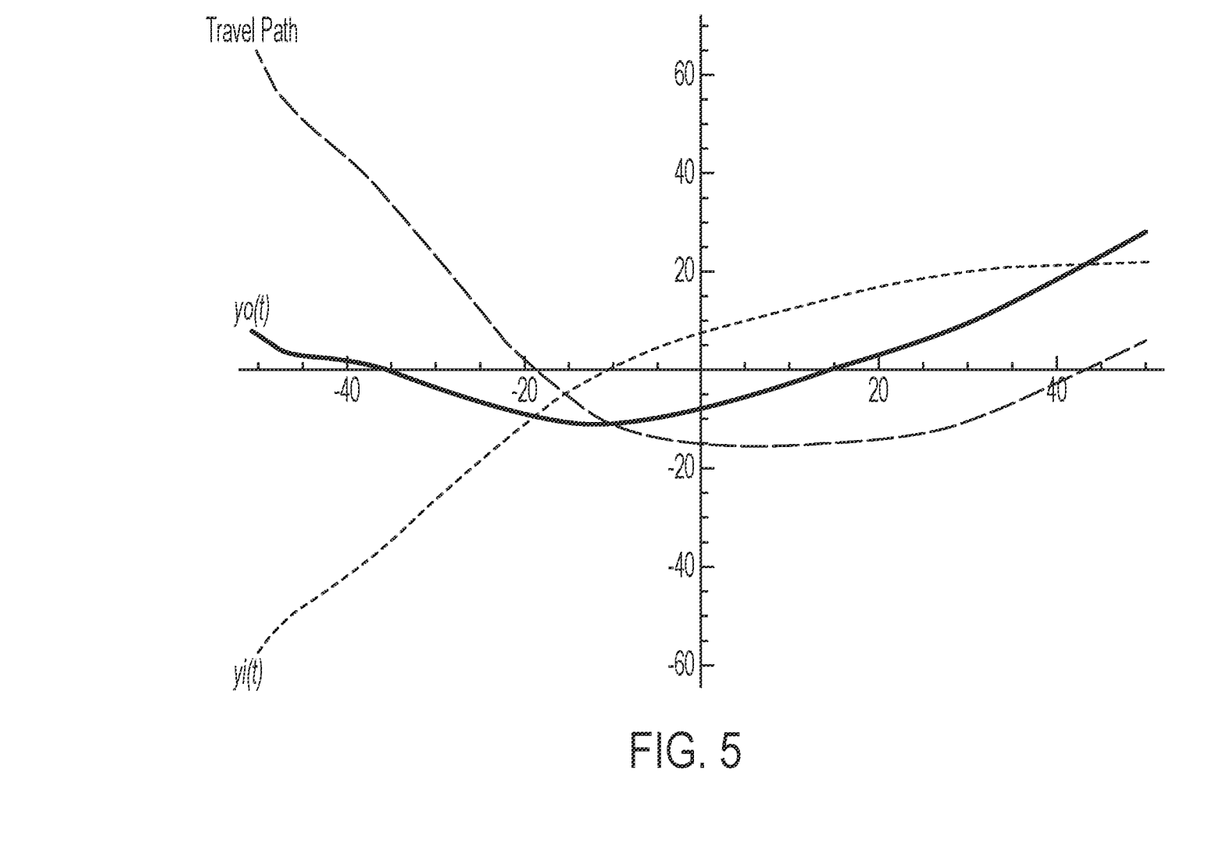
FIG. 5 generally illustrates the first derivatives continuous function that will result in a continuous second and third derivatives according to one aspect of the present disclosure.

FIG. 5 generally illustrates a continuous function that will result in a continuous second and third derivatives. More particularly, the first derivatives in a travel path 28 are defined in the form of a $9^{th}$ order polynomial function but a lower order, such as $4^{th}$ or $5^{th}$ would be enough to ensure continuous derivatives.

Figure 6:
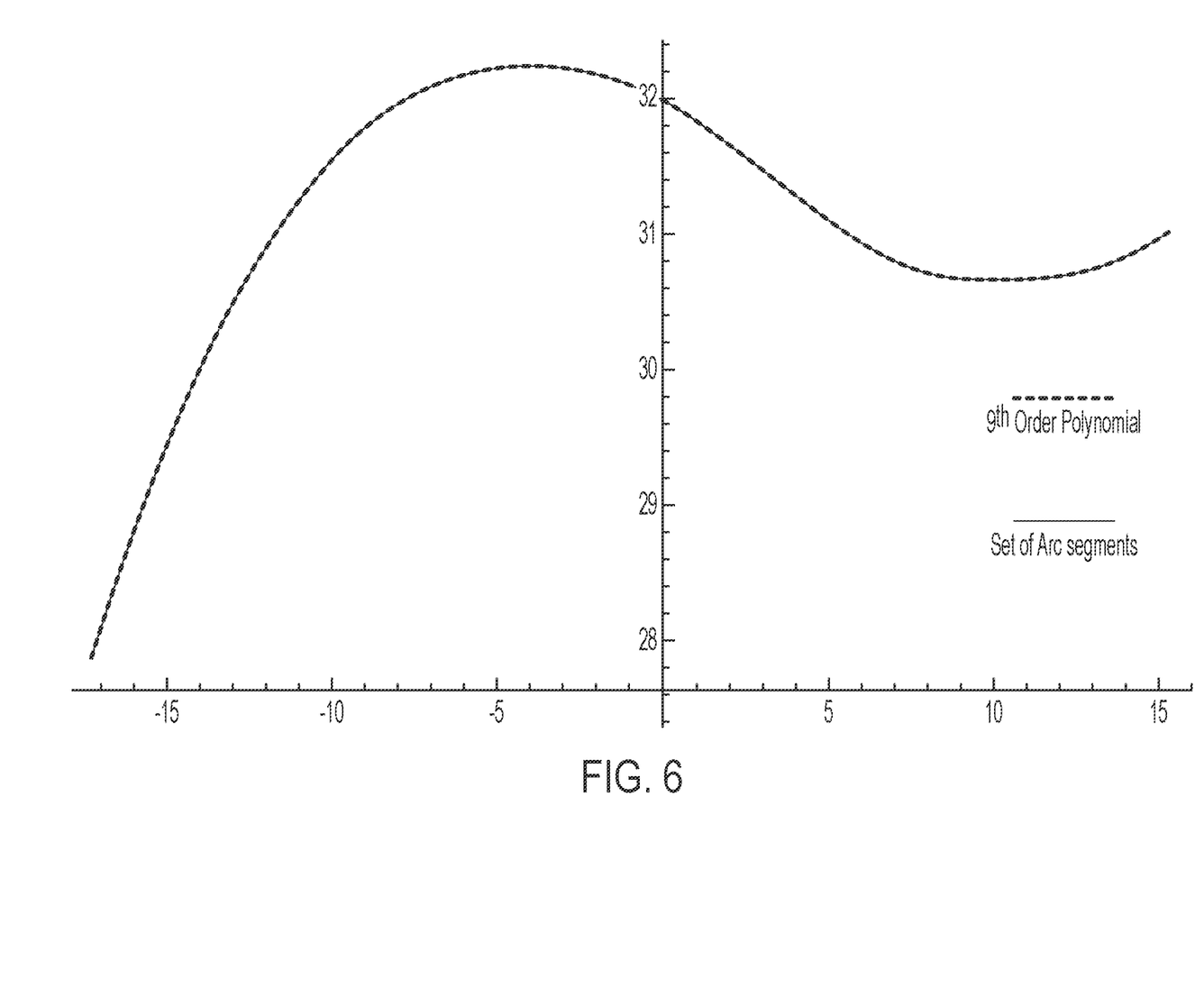
FIG. 6 illustrates an overlay of the ball track path defined by a set of arcs (solid) and a 9th order polynomial (dashed) according to one aspect of the present disclosure.

FIG. 6 illustrates an overlay of the ball track path defined by a set of arcs (solid) and a 9th order polynomial (dashed). It should be appreciated that the geometries appear the same but mathematically result in different attributes.

It should be appreciated that the constant velocity joint 10 of the present disclosure can obtain articulation angles of greater than 45 degrees. While not limited hereto, the constant velocity joint 10 may be, for example, a 6-ball joint or an 8-ball joint.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A constant velocity joint for a driveline system comprising:
   an inner joint part defining a plurality of inner ball races and an outer joint part defining a plurality of outer ball races;

the inner ball races and the outer ball races cooperate to form a plurality of tracks which each define a respective travel path, wherein at least one of the respective travel paths or tracks is defined as a constantly changing curve with a non-continuous radius, wherein the non-continuous radius is defined by a first portion of the travel path and a second portion of the travel path, the first portion and the second portion divided by a transition segment, wherein the first portion and the second portion are symmetrical, inverted opposites of each other; and a ball located in each of the plurality of tracks, wherein the constant velocity joint is operatively connectable to a driveshaft component.

2. A constant velocity joint for a steering system comprising:

an inner joint part defining a plurality of inner ball races and an outer joint part defining a plurality of outer ball races;

the inner ball races and the outer ball races cooperate to form a plurality of tracks which each define a respective travel path, wherein at least one of the respective travel paths or tracks is defined as a constantly changing curve with a non-continuous radius, wherein the non-continuous radius is defined by a first portion of the travel path and a second portion of the travel path, the first portion and the second portion divided by a transition segment, wherein the first portion and the second portion are symmetrical, inverted opposites of each other; and a ball located in each of the plurality of tracks, wherein the constant velocity joint is operatively connectable to a steering system component.

* * * * *